United States Patent [19]

Brullo

[11] 4,071,652

[45] Jan. 31, 1978

[54] THERMALLY CONDUCTIVE ELECTRICAL TAPE

[75] Inventor: Robert A. Brullo, White Bear Lake, Minn.

[73] Assignee: Minnesota Mining and Manufacturing Company, St. Paul, Minn.

[21] Appl. No.: 671,572

[22] Filed: Mar. 29, 1976

[51] Int. Cl.$^2$ .......................... B32B 5/16; B32B 27/20
[52] U.S. Cl. .............................. 428/323; 260/897 R; 427/207 B; 428/329; 428/326; 428/324; 428/325; 428/336; 428/343; 428/355; 428/913
[58] Field of Search ............... 428/323, 329, 330, 343, 428/355, 336, 324, 325, 913, 40, 332; 427/207 R, 207 B; 260/889, 897

[56] References Cited

U.S. PATENT DOCUMENTS

| 3,082,133 | 3/1963 | Hofmann et al. | 428/355 |
|---|---|---|---|
| 3,456,038 | 7/1969 | Newman et al. | 260/889 |
| 3,470,127 | 9/1969 | Snell et al. | 260/33.6 |
| 3,626,083 | 12/1971 | Buckley et al. | 260/37 |
| 3,657,469 | 4/1972 | Ryder | 260/80.78 |
| 3,684,644 | 8/1972 | Snell | 161/165 |
| 3,876,454 | 4/1975 | Snell et al. | 260/897 A |

Primary Examiner—George F. Lesmes
Assistant Examiner—P. J. Thibodeau
Attorney, Agent, or Firm—Cruzan Alexander; Donald M. Seil; Richard Francis

[57] ABSTRACT

Ethylene-propylene elastomer-based insulating (or semi-conductive) electrical tape is improved for long-term exposure to heat induced by high electrical current densities by the addition of sufficient thermally conductive non-black, non-reinforcing inorganic filler to endow the tape with a thermal resistivity no more than 350° C·cm per watt.

8 Claims, 1 Drawing Figure

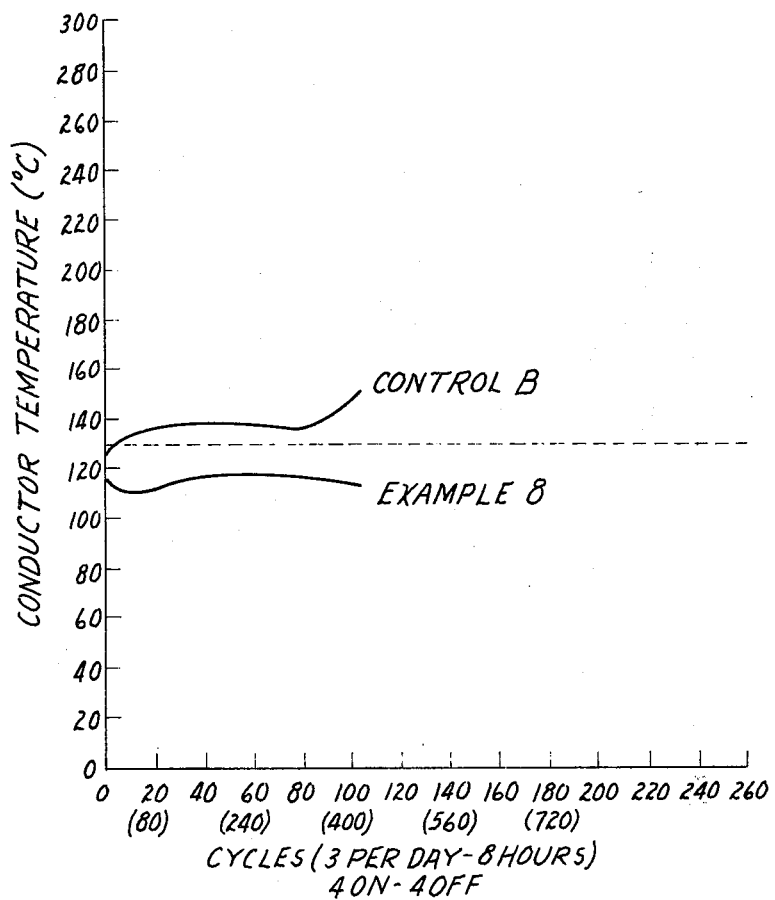

THERMALLY CONDUCTIVE ELECTRICAL TAPE

BACKGROUND OF THE INVENTION

The invention relates to ethylene-propylene elastomer-based insulating (or semi-conductive) electrical tape containing thermally conductive non-reinforcing filler.

Insulating tapes are required to replace electrical insulation which has been stripped from a conductor for any of a variety of reasons. For example, where two conductors are joined together to make a splice, such insulating tape is required to provide an insulating sheath over the joined ends of the splice. The insulating tape may be of the so called "self-fusing" type wherein the tape is in the form of a strip of elastomeric material which, when wrapped convolutely upon itself, will fuse together practically free of voids so that the layers become indistinguishable and paths for moisture to enter are excluded. Such self-fusing tapes are described in U.S. Pat. Nos. 3,470,127 and 3,684,644. Or, the tape may be in the form of an elastomeric strip which is coated with a pressure-sensitive adhesive material such as described in U.S. Pat. Nos. 3,876,454 and 3,684,644.

While the products described in these patents have been extremely commercially successful and found great acceptance throughout the industry, these and other similar products have been found to be deficient in situations involving electrical conductors which develop relatively high temperatures because of being subjected to high current densities.

Under such circumstances, the conductor and/or connector in the area of a splice or termination where such tape is typically required may be raised to a temperature which can cause a physical change or breakdown in the composition of an insulating tape and/or cable insulation. Such breakdowns are characterized by an increase of the temperature of the conductor and/or connector which typically causes increased resistance with rapid heat build up until the polymer material forming the tape is degraded. In the case of a splice, the temperature of the splice connector may exceed the maximum recommended operating temperature which can cause an increase in the contact resistance of the connector, resulting in further temperature build up. Such degradation of the insulating tape can cause mechanical and/or electrical failure.

Present prior art insulating tapes employed to replace insulation when a splice or termination is made are generally rated to withstand continuous operation at temperatures as high as 90° C and to withstand 500 hours at an overload temperature of 130° C. In the past, demands upon electrical power have been relatively moderate so that electrical conductors, e.g., cables and/or wires, have not generally been operated at their maximum capacity. Present day and future power demands, however, are much higher and, if they are not presently, many electrical power conductors will be operated at current densities which will cause heating to temperatures near or above the maximum rating for cables, connectors, insulating materials, and other equipment normally employed in electrical power distribution.

SUMMARY OF THE INVENTION

The present invention provides a thermally conductive electrically insulating (or semi-conductive) ethylene-propylene elastomeric-based tape which has exceptionally good electrical and physical properties to make it useful in most situations where conventional pressure-sensitive adhesive tapes and fusing tapes have been used. More importantly, the tape of the invention has superior thermal properties which makes it useful where high current densities (and thus high conductor temperatures) are developed.

The tapes of the invention are comprised of a blend of ethylene-propylene elastomer with an elastomer based substantially upon isobutylene and sufficient, semi-reinforcing or non-reinforcing, non-black, inorganic, non-metallic filler having a significant degree of thermal conductivity to endow the tape with a thermal resistivity of no more than 350° C·cm per watt. The elastomer also contains a thermoplastic resin such as polyethylene or polypropylene, tackifier, plasticizer, and softeners.

Tapes according to the invention containing semi-reinforcing or non-reinforcing thermally conductive filler and having a thermal resistivity of no more than 350° C·cm per watt will have sufficient thermal conductivity to permit the tape to dissipate heat when it is employed in a splice or termination as replacement insulation. Tape compositions not having this quantity of such a filler will not be so endowed and will fail under certain high current density situations where heat build up may be a problem. When so employed, the tape of the invention can reduce the operating temperature of a conductor or connector, unlike prior art tapes which can cause overheating of conductors and connectors.

THE DRAWING

The single FIGURE of the drawing is provided to facilitate understanding of the invention. The figure is a graphical representation of the heat dissipating ability with time of a tape according to the invention (designated "Example 8") as compared to a prior art tape (designated "Control B") in a simulated use test condition.

DETAILED DESCRIPTION

The amount of thermally conductive filler contained in the tape of the invention will vary depending upon its thermal conductivity. Generally, the thermally conductive electrically insulating ethylene-propylene elastomeric-based tapes of the invention will be comprised of about 100 parts by weight of elastomer, preferably having about 15–100 parts by weight of ethylene-propylene elastomer, with the balance being an elastomer based principally on isobutylene, between about 120 and 300 parts by weight (per 100 parts by weight elastomer) of semi-reinforcing or non-reinforcing, non-black thermally conductive filler, about 10 to about 50 parts by weight of a thermoplastic resin based upon polyethylene or polypropylene, up to 15 parts by weight of curing agent for the elastomer or elastomers having between 5 and 75 parts by weight of compatible tackifiers for the elastomer or elastomers, and between 10 and 50 parts by weight of compatible plasticizers and softeners for the elastomers.

Semi-reinforcing and non-reinforcing, non-black, thermally conductive filler should have a thermal conductivity of not less than $1.1 \times 10^{-3}$ Cal·cm/cm$^2$·°C·sec. If the thermal conductivity of the filler is near the lower limit of $1.1 \times 10^{-3}$ Cal·cm/cm$^2$·°C·sec, the composition of the tape may require somewhat more thermally conductive filler than the amount specified in the previous paragraph to obtain the necessary thermal resistivity of the tape. Useful thermally conductive fillers include iron oxide, zinc oxide, hydrated alumina such as that sold under the trade designation "Hydral 710", "Hydral 705" and "Solem SB-632", ground crystalline silica such as that sold under the trade designation "Min-U-Sil", natural amorphous silica such as that sold under the trade designation "S Micron Silica", and aluminum silicate such as the surface treated aluminum silicate sold under the trade designation "Burgess KE" and "Translink 37" and anhydrous aluminum silicate such as that sold under the trade designation "Burgess Icecap" and "Burgess Iceburg", and pulverized glass and mica.

Not all thermally conductive fillers will be suitable for use in the tape composition of the invention. Only those which are non-reinforcing or semi-reinforcing, as previously mentioned, will be suitable. That is, only thermally conductive fillers, having the aforementioned minimum degree of thermal conductivity which have little or no reinforcing effect upon elastomeric compositions will be useful.

While it is generally known to employ various fillers in elastomeric compositions to obtain improvements in certain physical properties such as tensile strength, modulus, hardness and electrical conductivity, prior to the present invention, as far as is known, no one has compounded an elastomeric tape to make it sufficiently thermally conductive to avoid the problem discussed above. This is understandable since many fillers which may be employed for this purpose can have a detrimental effect on the elastomeric backing. For example, some fillers reduce the elastic nature of the composition forming the tape so that it will not easily conform to an irregular conductor surface and/or the irregular surface formed by previously applied convolutions of the tape and when so applied may leave unprotected spaces for moisture to penetrate. Other fillers may actually weaken the composition so that the tape breaks easily as it is applied.

Great care must therefore be taken in the selection of the thermally conductive filler. Besides having the necessary thermal resistivity, the tapes according to the invention should have a modulus at 50% elongation of less than 350 psi to be sufficiently conformable for application to irregular surfaces. The tape of the invention should also have an ultimate elongation greater than 700% to have sufficient stretchiness to be easily wound upon a conductor or connector surface.

Generally, whether or not a filler is non-reinforcing depends upon its particle size. It would therefore appear that suitable thermally conductive fillers may be selected on the basis of their surface area and their average particle size. This approach has two drawbacks, however. There are several methods for measuring particle size with differing results. Some popular examples of measuring particle size include the nitrogen adsorption method, an air permeability method based upon the principle that a current of gas flows more readily through a bed of coarse powder than through a volumetrically equal bed of fine powder, a centrifugal method involving using a centrifuge to give a particle size distribution based upon the rate of sedimentation of the particles in a liquid medium and particle size data obtained with an electron microscope. The reported particle size can thus vary considerably depending upon the method selected. Also ignored in the particle size tests is the effect of surface modification of a particular particle such as by a silane treatment. Such surface treatments can drastically affect the reinforcement characteristics of a filler material, especially in a vulcanized composition.

Notwithstanding these problems, an approximation of the particle size and surface area of the suitable non-reinforcing and semi-reinforcing non-black filler materials for the present invention may be adopted. The average particle size should preferably be no smaller than 0.2 microns and most preferably no smaller than 0.5 microns. The surface area, as measured by nitrogen adsorption, should preferably not exceed 15 $m^2$ per g.

Elastomers based on polymers of ethylene and propylene plus polyisobutylene are preferred for making the elastomeric backing. It has been found that tapes based on these elastomers provide a tough, resilient rubbery base to which the other compounding ingredients may be added to give tapes having good chemical stability, environmental resistance, and electrical properties. When about 15 parts of the elastomers are ethylene-propylene rubbers, a satisfactory resistance to outdoor aging conditions such as ultraviolet radiation and ozone-filled atmospheres results. However, about 40 or more parts of the ethylene-propylene rubbers is preferred because of the high resistance of the elastomer to these elements.

The elastomeric backing for the tape of the invention can be compounded from any of a variety of elastomers, such as EPDM elastomer (ethylene-propylene terpolymer), EPM (ethylene-propylene copolymer), polyisobutylene or butyl rubber.

The tape backing composition may be given added tensile strength, body, and handleability, and adapted to easier processing by the inclusion, preferably, of a thermoplastic resin such as polyethylene or polypropylene. The strengthening effect of polyethylene or polypropylene that is associated with the preferred tape backing occurs with amounts of more than 10 parts (per 100 parts of rubber). Above about 50 parts, on the other hand, the increased strength provided by one of these resins is outbalanced by decreased conformability and elongation properties. As an alternative, or in combination with the thermoplastic resin, desirable properties described above can be imparted to the composition by a partial vulcanization produced through the incorporation of small amounts (about 1 to 15 parts) of a curing agent for the elastomer such as dicumyl peroxide, para-quinone dioxime, or polymethylol phenol.

One or more resinous tackifiers, chosen on the basis of compatibility with an effectiveness in tackifying the principle elastomeric components, may be included in some tape backings to achieve the desired self-fusing characteristics. Useful tackifiers will occur to those skilled in the art. Some commercially available tackifiers which have been found to be useful include "Staybelite" ester No. 10 (a glyceryl ester of hydrogenated resin), "Piccolyte" S-85 (a thermoplastic, terpene resin), and "Sta-Tac" B-100 (an aliphatic hydrocarbon resin). These tackifiers have been found to suitably tackify the elastomers when added in moderate amounts. The tackifiers can vary in amount between 5 and 75 parts (per 100 parts of elastomer), but the desirable amount may vary with effectiveness, type and overall loading of the other ingredients.

Plasticizers and softeners compatible with the elastomers may also be included in the tape backing composition to improve its stretch, flexibility, conformability, and flow properties as well as to improve processing. Preferably, these materials are present from about 10 to 50 parts per 100 parts of elastomer. Typical plasticizers and softeners include paraffinic process oils, naphthenic process oil, polybutenes, chlorinated paraffins, amorphous polypropylene and others. Some of these materials may provide dual functions, such as polybutene which may act as both a plasticizer and a tackifier.

While high levels of carbon black cannot generally be tolerated in insulating tapes because of poor dielectric strength, up to about 20 parts can be used to impart a black color and/or to reinforce the tape. Alternatively, conductive particles, such as acetylene carbon black, can be included in the base sheet to produce a semi-conductive tape.

Minor amounts of various additives may also be included in the backing compositions to enhance particular properties or add certain other characteristics. For example, lubricants such as low melting polyethylene or calcium stearate, flame retardants such as antimony oxide and halogenated compounds sold under the trade designations "FR-300 BA" and "Dechlorane 602", antioxidants such as 2,2'-methylene bis-(4-methyl-6-tertiary-butyl phenol), and colorants may be included. Minor amounts of other elastomers, e.g., natural rubber, chlorinated and acrylonitrile rubbers, may also be added to reduce cost, add more oil resistance and the like.

In the case of a pressure-sensitive adhesive coated tape, the pressure-sensitive adhesive can be of a variety of materials known for such use. The full description of these materials and the other particulars concerning the adhesive layer are aptly described in U.S. Pat. Nos. 3,876,454 and 3,684,644.

The pressure-sensitive adhesive can be any of a variety of materials known for such use. These materials are generally elastomers or compositions based upon elastomers, including for example polyacrylates, acrylates, silicone rubbers, polyvinyl ethers, natural rubbers, and SBR rubbers. These elastomers may require the addition of a suitable compatible tackifying material to improve their adhesive tack (adhesiveness). Other additives may also be added to the elastomers such as vulcanizing agents, plasticizers, anti-slumping agents, antioxidants and fillers. The pressure-sensitive adhesives are aggressively tacky in their normal dry form on tape and have the proper four-fold balance of adhesion, cohesion, stretchiness and elasticity, which permits an elastomeric backing coated therewith to firmly adhere on mere contact with finger pressing, and yet to be stripped back from smooth surfaces to which they are temporarily applied without delamination or offsetting of the adhesive. Certain synthetic polymers and copolymers have a molecular structure such that they inherently have the desired tacky rubbery properties, permitting their direct use, without addition of a tackifying material, as a rubber-based pressure-sensitive adhesive.

The pressure-sensitive adhesive should be present in a thickness of at least one fourth mil to provide an adequate degree of adhesion to the types of surfaces usually encountered in electrical applications. Thicknesses of adhesive greater than about 5 mils should be avoided in some cases, since above such a thickness certain adhesive compositions tend to ooze from the side of the roll and, while the tape may still be useful, the adhesive on the side of the roll attracts dirt and other unwanted particulate material which could interfere with the electrical resistance. Additionally, the pressure-sensitive adhesive should have an adhesion to steel of at least 3 ounces per inch width as measured by ASTM D-1000, a higher degree of adhesion being desirable for some applications. Preferably the adhesion value should be greater that about 10 ounces per inch width.

The preferred pressure-sensitive adhesives are formed of acrylate esters which are copolymerized with small proportions of additive copolymerizable monomers having strongly polar groups, viz., acrylic acid, methacrylic acid, acrylamide, methacrylamide, itaconic acid, or mixtures thereof, to provide adhesive masses which in the form of pressure-sensitive adhesive coatings are high in cohesive or internal strength while still retaining a high degree of stickiness or tackiness. Such adhesives are disclosed in U.S. Pat. No. Re. 24,906, the disclosure of which is incorporated herein by reference.

The tape of the invention can be prepared by utilizing conventional rubber compounding and tape coating techniques, as will be illustrated in the following examples. The ingredients comprising the backing material can be blended on a conventional rubber mill or other equipment used for this purpose and thereafter sheeted to provide a uniformly thick layer. One embodiment of the invention, a self-fusing tape, will be produced in this manner if the sheeted composition is self-fusing. To produce a pressure-sensitive adhesive coated tope according to the invention, the sheet is coated with the pressure-sensitive adhesive. The adhesives may be applied to this layer by hot melt or solvent solution coating techniques, or by any other convenient method. A layer of conventional primer may be included in some situations to promote adhesion of the adhesive to one side of the backing. The adhesive may also be first coated on a release liner and thereafter calendered or otherwise laminated to a superimposed elastomeric backing with the application of moderate heat and pressure.

TESTING PROCEDURES

The thermal resistivity of a tape is measured by convolutely wrapping a 5 inch wide strip of test tape around a 5 inch long aluminum pipe having an inner diameter of about ⅜ inch and an outer diameter of about ½ inch to provide a roll approximately 2½ to 3 inches in diameter. Thereafter, a 5 inch long 300 watt electrical heater having a shape corresponding to the inner space of the aluminum pipe is placed with the pipe. The tape roll is insulated by placing glass wool over both ends. The heater is activated by impressing a voltage of about 23 volts (d.c.), resulting in about ½ amp being drawn. A previously inserted thermocouple, placed in a longitudinal slot on the exterior of the aluminum pipe extending from one end of the pipe to the center beneath the first convolution of tape such that the sensing end is exactly midway between the ends of the pipe, is employed to monitor temperature every 20 seconds for a period of about 8 minutes. Thermal resistivity is calculated using the formula $R = 4\pi/QB$, wherein "$R$" is resistivity in °C·cm per watt, "$Q$" is the heat input in watts per cm (obtained by multiplying heater operating voltage times current per unit length of heater) and "$B$" is the slope of the line obtained from a plot of the reciprocal of the rate of temperature change with time versus time.

Tensile strength at 50% elongation (sometimes referred to as the "modulus at 50% elongation") and ultimate elongation (sometimes referred to as the "elongation at break") were measured on an "Instron" tensile testing device, using a stretch rate of 20 inches per minute with a 0.5 inch wide sample and using an initial separation between the jaws gripping the sample of 1 inch.

Evaluation of the tape in a simulated use situation involved fastening the ends of a high voltage conductor with a connector and overwrapping the connector and joined ends of the conductors with sufficient tape to provide insulation according to a well known commercial procedure. Before the insulating tape was applied, a thermocouple was installed at the surface of the connector to monitor the temperature of the connector under simulated use conditions.

The test procedure was as follows:

1. A 4 foot length of 500 KcMil stranded aluminum cable having 260 mil thick crosslinked polyethylene insulation is cut into two 2 foot segments so that the cable ends butt squarely.

2. The exterior coaxial neutral wires are bent away from the cable jacket, on the conductor ends to be joined, for a distance of approximately 12½ inches and the wires twisted together to form a stranded conductor. About 10½ inches of the semi-conductive jacket of the cable is removed from each end of the cable to reveal the underlying insulation.

3. About 2¾ inches of the insulation immediately adjacent the cable is removed from each end of the cable to reveal the conductor surface.

4. The ends of the insulation are then tapered for about 1½ inches.

5. The conductor ends are then joined with a "Burndy" YS34A aluminum "Hypress" connector following the manufacturer's directions.

6. A thermocouple is attached to the center of the exterior surface of the connector and the thermocouple wires are run along one of the cables a sufficient distance so that its end is outside the splice area.

7. Semi-conductive tape (that sold under the trade designation "Scotch" Brand No. 13 semi-conductive tape by the 3M Company) is used to fill the indentations in the connector caused by making the connection and is applied between the ends of the tapered insulation with two half-lapped layers to cover the exposed conductors and the connector, to overlap the insulation by 1/16 of an inch.

8. The test insulating tape being evaluated herein is then applied over the semi-conductive tape up to ¼ inch from the cable semi-conductive jacket with half-lapped layers until a thickness over the center of the semi-conductive tape is approximately ½ inch.

9. Semi-conductive tape described above is then applied over the insulating tape with one half-lapped layer, the body of which extends to the bends of the neutral wires.

10. The test insulating tape is then wrapped with one half-lapped layer of vinyl plastic tape (that sold under the trade designation "Scotch type 33+" vinyl tape by the 3M Company) to completely cover the entire taped area, stretching the vinyl tape tightly to flatten out the underlying tape.

11. The entire splice is then wrapped with four half-lapped layers of the test insulating tape over the entire splice followed by two half-lapped layers of vinyl plastic tape.

12. The neutral wires are then bent back into place and cut to proper length and joined with a connector following the connector manufacturer's specification.

13. Alternating current is then applied to the conductor, at a previously determined current flow which causes the same unspliced conductor to heat to 130° C, in cycles 4 hours "on" and 4 hours "off" with the temperature at the conductor surface being measured at 3½ hours into an "on cycle". Such cycling is typically continued for about 500 hours and the temperatures recorded plotted to obtain a "profile" of the connector temperature, the same being depicted in the FIGURE. The temperature profile of connectors insulated with tapes of the invention will not exceed 130° C while those employing prior art tapes all eventually exceed 130° C.

The invention is further illustrated by the following examples, wherein all parts are by weight unless otherwise specified.

Examples 1–4

| Parts | Elastomeric Sheet General Formulation |
|---|---|
| | Ingredient |
| 50 | Ethylene-propylene-diene terpolymer elastomer having a Mooney value of 70 ("Nordel" 1070) |
| 50 | Polyisobutylene elastomer ("Vistanex" L-140) |
| 8 | Carbon black filler, furnace grade ("Raven" 890) |
| 28 | Polypropylene thermoplastic resin having a nominal melt flow of 4 as measured by ASTM D-1238 ("Profax" 6523) |
| 18 | Polybutene plasticizer/tackifier having a 2,700 MW ("Oronite" 128) |
| 17 | Paraffinic rubber process oil plasticizer ("Sunpar" 2280) |
| 16 | Thermoplastic terpene resin tackifier ("Piccolyte" Resin No. S-85) |
| 2.5 | Zinc resinate having a melting point of 164° C and an acid number of zero ("Zirex" resin) |
| 1 | 2,2'-methylene-bis(4-methyl-6-t-butyl phenol antioxidant (American Cyanamid AO 2246) |

The ingredients set forth above were blended together with additional filler as specified below on a conventional rubber mill, with roll surfaces heated to 360° F, to obtain a homogeneous blend which was fed through a 4 roll inverted "L" calender, having an offset roll heated to 360° F, top roll to 360° F, middle roll to 355° F and bottom roll to 180° F, on to a release liner to form elastomer sheets approximately 30 mils thick. The sheets were rolled into jumbo rolls about 30 feet long. The jumbo rolls were slit into ¾ inch or 1 inch widths for ultimate use.

Examples 1–4 were prepared using, with the elastomeric sheet general formulation described above, varying amounts of ground crystalline silica thermally conductive filler (sold under the trade designation "Min-U-Sil 30 Microns") having an average particle size of about 4 microns and a thermal conductivity of about $1.25 \times 10^{-3}$ cal·cm/cm$^2$·°C·sec and a surface area of about 0.54m$^2$/g (N$_2$ adsorption). Control Example A was prepared in the same manner, but with an insufficient amount of the silica filler to provide the necessary level of thermal resistivity. The amount of thermally conductive filler for each example and the physical properties of the resultant tapes are shown in Table I below.

Table I

| Ex. No. | Parts Filler | Thermal Resistivity (° C cm/watt) |
|---|---|---|
| A | 122 | 416 |
| 1 | 180 | 340 |
| 2 | 240 | 291 |
| 3 | 300 | 250 |
| 4 | 350 | 221 |

To demonstrate the significance of using a thermally conductive filler having a thermal conductivity of at least 1.1 × 10$^{-3}$ Cal·cm/cm$^2$·°C·sec, talc filler sold under the trade designation "Mistron vapor" having a thermal conductivity of about 0.9 × 10$^{-3}$ cal·cm/cm$^2$·°C·sec, surface area 20 m$^2$/g and 6 micron maximum particle size was employed in varying amounts with the elastomeric sheet general formulation described above. Filler amounts and the physical properties of the resultant tapes (Control Examples B-F) are shown in Table II below.

Table II

| Control Ex. No. | Parts Filler | Thermal Resistivity (° C cm/watt) | 50% Modulus (psi) | Ultimate Elongation (percent) |
|---|---|---|---|---|
| B | 61 | 541 | 223 | >1000 |
| C | 120 | 487 | 266 | 980 |
| D | 180 | 431 | 416 | 660 |
| E | 300 | 360 | 475 | 530 |
| F | 350 | 336 | 599 | 350 |

Note that while Control Example F possesses the required thermal resistivity to avoid thermal run away, it has too high a modulus and too low an ultimate elongation, making it a poor tape composition.

EXAMPLES 5-10

Following the procedures described above, Examples 5-10 (Al$_2$O$_3$·3H$_2$O) thermally conductive filler (sold under the trade designation "Hydral 710") having a particle size of 0.48 microns, surface area of 6-8 m$^2$/g, and a thermal conductivity of about 2.6 × 10$^{-3}$ cal·cm/cm$^2$·°C·sec. Parts and tape physical properties are set forth in Table III below.

Table III

| Ex. No. | Parts Filler | Thermal Resistivity (° C cm/watt) | 50% Modulus (psi) | Elongation at Break (percent) |
|---|---|---|---|---|
| 5 | 60 | 480 | 228 | >1000 |
| 6 | 120 | 371 | 217 | >1000 |
| 7 | 180 | 297 | 291 | 995 |
| 8 | 240 | 250 | 244 | 950 |
| 9 | 300 | 215 | 317 | 890 |
| 10 | 350 | 187 | 247 | >1000 |

The FIGURE is a diagrammatic representation of splice temperature profiles using control tape Example B and Example 8, respectively, each being labeled accordingly. The temperature profiles were obtained as a result of the simulated use test described above. Note that Control Example B becomes involved in a thermal run away after but a few hours, while Example 8 according to the invention maintains an operating temperature less than 130° C even after 400 hours of operation.

EXAMPLES 11-15 AND CONTROL G

Following the procedures set forth above, Examples 11-15 and Control G were prepared using the following elastomeric formulation with the thermally conductive filler specified in Table IV below.

Elastomeric Sheet Formulation

| Parts | Ingredient |
|---|---|
| 37.5 | Polyisobutylene ("Vistanex" L-140) |
| 37.5 | Ethylene-propylene-diene terpolymer having a Mooney value of 70 ("Nordel" 1070) |
| 25 | Butyl rubber ("Butyl" 165) |
| 25 | Polypropylene ("Profax" 6523) |
| 100 | Conductive carbon black ("Vulcan" XC-72) |
| 10 | High molecular weight isobutylene based tackifier ("Paratac") |
| 20 | Tackifier, pale thermoplastic resin derived from the polymerization of mixed olefins having a ball and ring softening point of 100° C ("Statac" B-100) |
| 44 | Tackifier, polyisobutylene having a Staudinger viscosity average molecular weight of about 10,000 to 11,700 ("Vistanex" LMMH) |
| 1 | Stearic acid |
| variable | Paraffinic rubber process oil ("Sunpar" 2280) |
| variable | Hydrated alumina ("Hydral" 710) |

Table IV

| Example No. | Parts Process Oil | Parts thermally Conductive Filler* | Surface Resistivity (ohms-cm × 10$^{-3}$) | Thermal Resistivity (° C. cm/watt) |
|---|---|---|---|---|
| Control G | 0 | 0 | 6.3 | 410 |
| 11 | 5 | 60 | 10.3 | 347 |
| 12 | 10 | 120 | 24.2 | 284 |
| 13 | 15 | 180 | 33.7 | 250 |
| 14 | 20 | 240 | 65.0 | 234 |
| 15 | 25 | 300 | 61.7 | 193 |

*plus the 100 parts electrically (and thermally) conductive carbon black filler

As revealed by the foregoing data, semi-conductive tapes are also improved according to the invention.

Example 16 and Control H

| Parts Example 16 | Parts Control H | Ingredients |
|---|---|---|
| 50 | 50 | Butyl rubber ("Butyl" 165) |
| 50 | 50 | Ethylene-propylene-diene terpolymer having a Mooney value of 70 ("Nordel" 1070) |
| 8 | 8 | Carbon black filler, furnace grade ("Raven" 890) |
| 23 | 23 | High density polyethylene ("Hifax" 1400) |
| 25 | 25 | Paraffinic rubber process oil ("Sunpar" 2280) |
| 17 | 17 | Glyceryl ester of hydrogenated rosin ("Staybelite Ester #10") |
| 8 | 8 | Thermoplastic terpene resin ("Piccolyte" Resin No. S-85) |
| 2.5 | 2.5 | Zinc resinate having a melting point of 164° C and an acid number of zero ("Zirex" resin) |
| 2 | 2 | Vinyl silane coupling agent ("Silane A-172") |
| 1 | 1 | Antioxidant, 2,2'-methylene-bis(4-methyl-6-t-butyl phenol) |
| 5 | 5 | a-a'-bis(t-butyl peroxy) diisopropyl benzene, 40% active ("Vul Cup 40KE") |
| 2 | 2 | Calcium Stearate |
| — | 61 | Talc ("Mistron Vapor") |
| 240 | — | Al$_2$O$_3$·3H$_2$O ("Hydral" 710) |

The foregoing compositions were cured by heating in an autoclave at 300° F for 2 hours. Evaluation of the resultant tapes revealed that the thermal resistivity was not affected by vulcanization and a useful tape (Example 16) according to the invention was produced.

Thermal resistivities of Examples 16 and Control H (before and after vulcanization) are set forth in Table V below.

Table V

| Example | Thermal Resistivity (° C. cm/watt) | |
| --- | --- | --- |
| | Unvulcanized | Vulcanized |
| 16 | 260 | 259 |
| H | 530 | 522 |

What is claimed is:

1. A thermally conductive tape capable of insulating heated conductor surfaces carrying high current densities, said tape being a strip formed of a composition comprising a blend comprised of ethylene propylene elastomer and an elastomer based principally on isobutylene, sufficient semi-reinforcing or non-reinforcing, non-black filler having a thermal conductivity of at least $1.1 \times 10^{-3}$ cal·cm/cm$^2$·°C·sec to endow the tape with a thermal resistivity of no more than 350° C·cm per watt, a modulus at 50% elongation of less than about 350 psi, and an ultimate elongation greater than about 700%, about 10–50 parts per 100 parts by weight elastomer of thermoplastic resin selected from polyethylene and polypropylene or mixtures thereof, about 5–75 parts per 100 parts by weight elastomer of compatible tackifier for said elastomer, and about 10–50 parts per 100 parts by weight elastomer of compatible plasticizers and softeners for said elastomers.

2. The thermally conductive tape of claim 1 in which said strip further includes, firmly united to one major surface thereof, a layer at least 0.25 mil in thickness of a pressure-sensitive adhesive composition.

3. The thermally conductive tape of claim 2 wherein said pressure-sensitive adhesive is an acrylate copolymer adhesive or a rubber-based adhesive.

4. The thermally conductive tape of claim 1 wherein said semi-reinforcing or non-reinforcing filler is selected from the group consisting of iron oxide, zinc oxide, hydrated alumina, ground crystalline silica, natural amorphous silica, aluminum silicate, anhydrous aluminum silicate, ground mica and pulverized glass.

5. The thermally conductive tape of claim 1 wherein said non-reinforcing or semi-reinforcing filler has an average particle size of at least 0.2 microns and an average surface area as measured by nitrogen adsorption of not more than 15 m$^2$ per gram.

6. The thermally conductive tape of claim 1 wherein said composition also includes sufficient electrically conductive filler to make said tape electrically conductive.

7. The tape of claim 6 wherein said electrically conductive filler is conductive carbon black.

8. A thermally conductive tape capable of insulating heated conductor surfaces carrying high current densities, said tape being a strip formed of a composition comprising:
  a. about 100 parts of a blend comprised of 15 to 100 parts by weight ethylene propylene elastomer, with the balance being an elastomer based principally on isobutylene;
  b. sufficient semi-reinforcing or non-reinforcing, non-black filler having a thermal conductivity of at least $1.1 \times 10^{-3}$ cal·cm/cm$^2$·°C·sec to endow said tape with a thermal resistivity of no more than 350° C·cm per watt;
  c. about 10–50 parts (per 100 parts elastomer) by weight of thermoplastic resin selected from polyethylene and polypropylene or mixtures thereof;
  d. about 5–75 parts (per 100 parts elastomer) by weight of compatible tackifier for said elastomer;
  e. about 10–50 parts (per 100 parts elastomer) by weight of compatible plasticizers and softeners for said elastomer;
  f. up to about 15 parts (per 100 parts elastomer) curing agent for said elastomer; and
  g. up to 20 parts (per 100 parts elastomer) carbon black filler.

* * * * *

UNITED STATES PATENT AND TRADEMARK OFFICE
CERTIFICATE OF CORRECTION

PATENT NO. : 4,071,652
DATED : January 31, 1978
INVENTOR(S) : ROBERT A. BRULLO

It is certified that error appears in the above-identified patent and that said Letters Patent are hereby corrected as shown below:

In the Attorney Designation:

"Donald M. Seil" should read --Donald M. Sell--.

In the Specification:

Page 5, line 2 (Col. 2, line 62), "°C.°" should read --°C.--.

Page 12, line 13 (Col. 6, line 23), "tope" should read --tape--.

Page 18, lines 17-18 (Col. 9, line 37), "ples ($Al_2O_3$. hydrated" should read --Examples 5-10 were prepared using hydrated alumina ($Al_2O_3$--.

Page 22, line 5 (Col. 10, line 38) should read:

--Example 16   Control H   Ingredients--.

Signed and Sealed this

Sixteenth Day of May 1978

[SEAL]

Attest:

RUTH C. MASON
Attesting Officer

LUTRELLE F. PARKER
Acting Commissioner of Patents and Trademarks